Patented Sept. 22, 1953

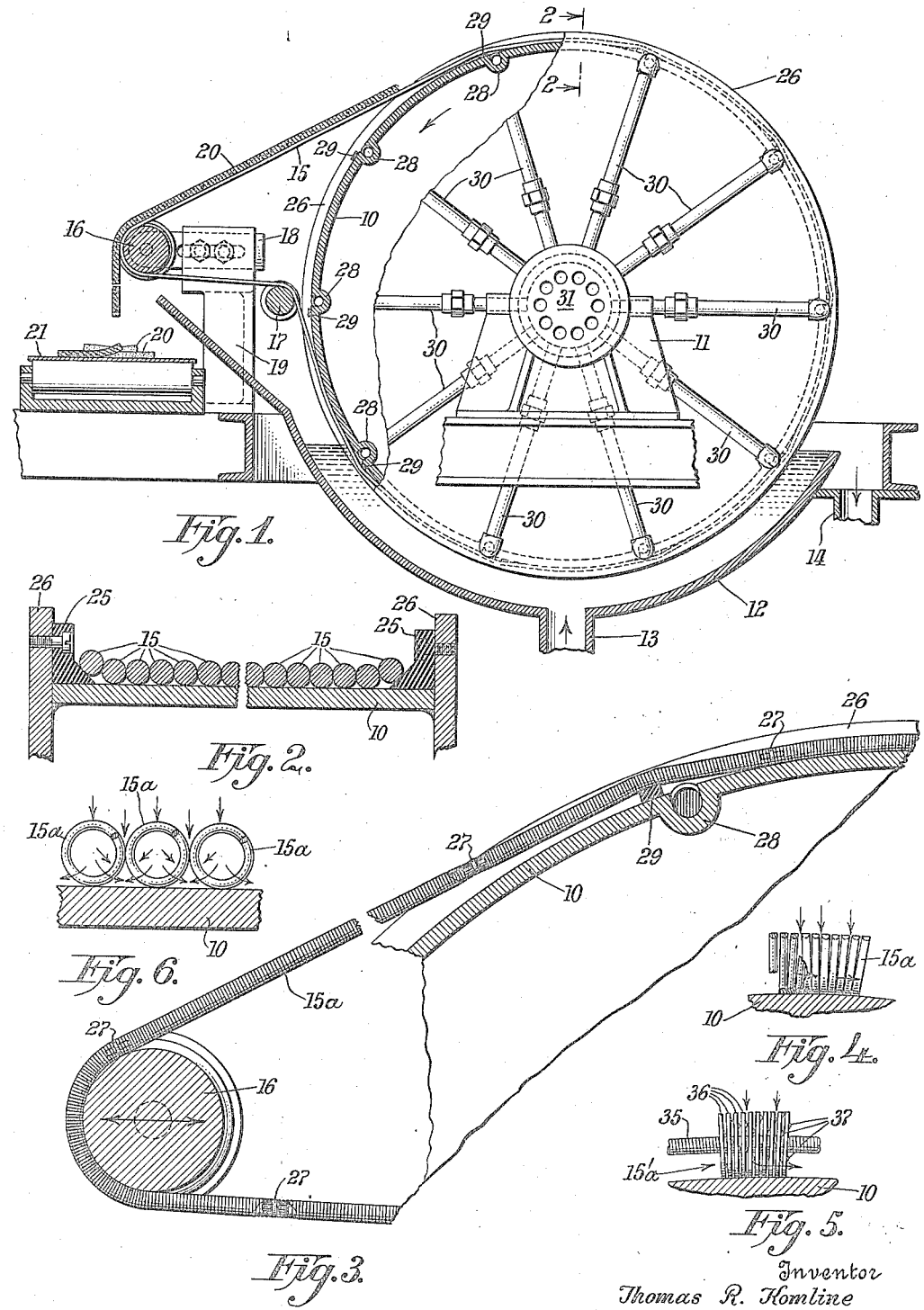

2,652,927

UNITED STATES PATENT OFFICE 2,652,927

FILTER MEDIUM FOR ROTARY DRUM FILTERS

Thomas R. Komline, Ridgewood, N. J.

Application June 11, 1948, Serial No. 32,484

3 Claims. (Cl. 210—197)

This invention relates to improvements in filters and in particular to an improved filter medium for a continuous rotary vacuum drum filter.

One known type of continuous drum filter employs a woven cloth filter web which is trained over a portion of the periphery of the drum during a solids accumulating vacuum phase of the machine cycle and is diverted from the drum to convey and discharge accumulated dewatered solids during the balance of the cycle. While trained away from the drum, the web reverses its direction over a discharge roller of relatively small radius at which location the solids are dissassociated from the web and drop to a conveyor to be suitably disposed of. The arrangement of instrumentalities for accumulating filter cake and for conveying and discharging the solids is well organized, nevertheless, by reason of a tendency to blind and to track unevenly, cloth web filter elements for this type of filter are generally unsatisfactory.

A web composed of a series of parallel contiguous cords, either helically wound on the drum and over discharge and aligning rollers or individually trained over the drum and supplementary rollers, has been used in a limited way as a substitute for a cloth web, but also with somewhat unsatisfactory results. While a variety of kinds of cords have been developed for the latter application, the most desirable to date have been found to be cords comprising certain grades of woven textile materials. With textile cords, effluent may pass between the strands of cord and through the interstices which exist between ajacent cords, and, by reason of the deformable nature of such textile materials, the cords will conform with each other and a satisfactory vacuum seal may be maintained on the drum which is essential to the performance of the filter.

Textile cords have a serious disadvantage, however, in that the quality of cord adopted for a particular problem of filtration involving a particular solid suspension may differ widely from that which is required for another material to be filtered. Individual problems of sewage and industrial wastes give rise to many variables of filtration making it necessary in most instances to choose a grade of cord for each particular application and, in many cases, it is impossible to find a completely suitable cord material because of the fact that the chemical and mechanical properties of wastes vary from day to day. It has also been found that the textiles used for some cord filter mediums are difficult to splice together at their respective ends to be made endless and, moreover, they have only moderately strong physical characteristics. For this latter reason cords are frequently broken during the operation of a textile cord filter making it necessary to shut the filter down for substantial periods of time during which replacement cords are applied. A still further disadvantage of a textile cord as a component of a filter medium resides in the fact that textile cords stretch and shrink and are difficult to tension properly, resulting in sagging or jumping of the cords on the drum. All in all, while textile cords have some desirable properties as a filtration medium, they have substantial disadvantages which preclude their satisfactory operation for a day in and day out mechanical process.

I have discovered that closely coiled metal tension spring filaments having prescribed physical properties and size specifications serve to overcome the above difficulties inherent in textile cords when applied as a web of contiguous endless strands over a filter drum. Coil springs may be regulated very accurately for size and material and they may be used in abutting relationship in a manner whereby the effluent of filtration will pass between the successive spring coils as well as between adjacent springs. In the design of spring filaments consideration is given to the radius of curvature of the filter drum surface whereby a slight separation between the coils resting on the drum may be effected to permit the passage of effluent, but at the same time prevent the passage of objectionable solid material which would otherwise tend to clog and blind the filter medium. To avoid a loss of vacuum through the interior of the hollow springs the filaments are assembled from a multiplicity of short spring lengths which are coupled together by the use of solid threaded plugs. By reversing the direction of the coil spring filter medium over a discharge roller of appropriate diameter, the coils of the spring filaments may be made to separate in a manner which aids the dischargeability of the solids. By reason of the fact that a high degree of accuracy may be had in spring coil size, it is possible to arrange the filaments across the drum colinearly rather than to stagger them to compensate for errors in size, although this is not essential to operation and staggering may be used if desired. Any cumulative error of filament diameter may be compensated for by providing an inclined sealing surface at the drum heads for abutment with the end filaments. Constant tension is obtained by the action of the spring forming the filament.

In a modification described herein, the filament comprises a coil spring core of smaller diameter provided with a shroud or covering of detached flat metal discs. The spring core does not, in itself, act as a medium for filtration, but serves to supply the necessary uniform tension for the filaments. The flat metal discs will act in a similar manner with the spring coils, separating slightly to permit the passage of effluent therebetween and resist the passage of accumulated solids. Other like arrangements may be resorted to with a similar effect, an important consideration being the provision of parallel, contiguous, flexible filaments between which and through which effluent may pass, each filament consisting of a series of non-pervious rings or coils or discs which are spring biased along their longitudinal axes for effluent passage therebetween.

My invention, as further described in a preferred embodiment thereof, resides principally in the filtering medium and in the process with which it is used. It will be understood that changes may be made in the size and shape of materials and in their physical properties without departing from the scope of the sub-joined claims.

In the drawings,

Figure 1 is a diagrammatic side elevation view, partly in cross-section, showing the arrangement of parts of a drum filter according to my invention, Figure 2 is a fragmentary cross-section view taken through the filter drum surface along the lines 2—2 of Figure 1, Figure 3 is a cross-section view in fragmentary form and on an enlarged scale illustrating a filter medium filament of my invention as it traverses the filter drum and the discharge roller, Figure 4 is an enlarged fragmentary view of a short section of filtering medium filament resting on the surface of the drum, Figure 5 is a view showing a modified form of filtering medium similar to that of Figure 4, and Figure 6 is a fragmentary cross-section view of the filtering medium of Figure 4 or 5 illustrating the path of flow of fluid.

Referring to the drawing and particularly to Figure 1, the filter used with my invention may be a more or less standard structure in the art of filtration wherein a large hollow drum 10 is trunnioned for rotation in bearing brackets 11 and connected to a suitable source of power whereby continuous slow rotation is effected in the direction of the arrow. The drum 10 is partially immersed in a tank 12 containing a supply of fluid or waste to be filtered having a centrally located, upwardly directed intake 13 and a downwardly directed overflow 14. The drum, tank, and other instrumentalities and appurtenances are supported on an appropriate framework preferably constructed of channel iron sections.

As the drum revolves it carries with it a web filter medium 15 trained over a major portion of the cylindrical drum surface and trained away from the drum over a tracking discharge roller 16, from which it returns to the drum over a directioning roller 17. Vacuum is applied through the drum trunnion to segments of the drum surface under the filter medium 15 in sequence with the rotation of the drum and in a known manner whereby the fluid is drawn through the filtering medium and is transported away from the machine, leaving an accumulation of filter cake 20 on the surface of the filter medium 15 as it leaves the drum. Cake 20 becomes detached from the filter medium 15 and drops to a suitable belt conveyor 21 as the filter medium 15 traverses the discharge roller 16 and the cake is thereafter carried by the conveyor to a remote location for further processing or for disposal. Discharge roller 16 is adjustably supported on horizontal brackets 18 which, in turn, are supported on vertical members 19 tied-in to the channel iron frame and, by adjusting brackets 18 horizontally to the right or left, the path of travel of the filter medium may be decreased or increased to provide suitable tension for the filter medium.

Referring now to Figures 2 and 3, the filter medium 15 is composed of a series of parallel contiguous metal filaments 15a spaced across the drum to form a web. The lay of the filaments on the drum, as shown in Figure 2, is preferably that, with the exception of the end filaments, they lie in the same horizontal plane, each filament contiguous with the adjacent filament, and the end filaments resting on inclined sealing rings 25 which are rigidly attached to the drum heads 26. If an accumulation of positive errors in filament diameters occur, the end filaments will be disposed to a slightly higher position above the drum surface tangent to the inclined surface of sealing rings 25 and to the adjacent filaments. If the reverse is true, and negative errors in filament diameters accumulate, the end filaments will be positioned nearer to the drum surface, still resting against and tangent to the sealing rings 25 and the adjacent filaments.

Figure 3 shows a single filament 15a resting on the drum 10 and trained away from the drum over discharge roller 16. I prefer to construct the filaments of a series of helical coiled metal springs wound from half-round wire which are made continuous by the short connecting studs 27 which threadedly engage the interior of the coils of the springs. At the same time the connecting studs 27 form baffles to effectively prevent the passage of liquid longitudinally through the filaments. When in contact with the drum surface, the disposition of the spring filaments is such that the spring coils are close together, as in Figure 4, on the drum surface at the inside web surface and slightly spaced with respect to each other on the outside of the web. By adjusting the position of discharge roller 16 this coil spacing may be increased or decreased to provide a satisfactory condition for filtration, whereby the liquid will flow between the helical coils and between adjacent filaments to the substantially triangular channels formed under the filaments as shown in Figure 6. Thence, the liquid will flow circumferentially of the filter drum until it reaches the large drum drainage channel 28 adjacent segmental sealing strips 29 to be removed through the exterior piping 30 and trunnion 31. At the same time, solids which are suspended in the liquid will not be permitted to pass between the spring coils and will, therefore, accumulate on the outside of the filter web as shown in Figure 1, to be discharged to the conveyor as the web reverses over the notched discharge roller 16. It will be noted here that the opening between adjacent filament coils or helices will be substantially greater on the discharge roller than on the drum because of the relatively smaller radius, thus enhancing the disassociation of the sludge from the web for trouble-free disposition.

As an alternative filament construction, I use the arrangement of Figure 5 comprising a tension spring 35 of small diameter surrounded by a continuous abutting series of deformed metal washers or discs 36. Spring 35 is ineffective in itself as a filtration element, washers 36 serving in the manner of the helical coils of the spring type filament to permit the passage of effluent therebetween and restrain the solids. Slight deformations 37 may be impressed on the washer surfaces to provide a minimum spacing for filtration, and spacing may be increased by adjusting the tension of spring 35 through positioning of the discharge roller 16. The alternative style filaments of Figure 5, like the spring coil filament of Figure 4, may be composed of a series of short lengths made endless by the use of short connecting links (not shown) having female threads to engage over the coils of springs 35 and forming retaining abutments to hold the washers in position.

To assemble the filaments 15a on the drum, the calculated lengths are provided and they are placed in position over the drum and the freely rotatable guide rollers and made endless with connecting studs or links. I prefer to move the discharge roller 16 to the extreme right and to apply the filaments with slight tension. When all filaments are so positioned, the roller 16 may then be moved to the left and secured in position with appropriate operating tensioning of the filaments. If a tendency exists during filter operation for the filaments to separate from each other longitudinally of the drum axis, compensation may be had by using a suitable combination of right and left hand springs in the case of spring type filaments 15a or by appropriately shaping the guide rollers or the drum surface elements when using the disc type filaments to effect a slight crowding action directed toward the drum center.

During operation the filaments will be moved as the filter drum revolves and the cycle of operation will follow that of prior art devices of this kind, effluent passing between the filaments and through the filaments to discharge. Filtercake will build up on the filaments during passage of the drum through the material being filtered to be conveyed and discharged remotely from the drum.

Having thus described my invention, I claim:

1. Filtering apparatus for a drum filter of the type employing an axially rotatable drum and a discharge roller remotely spaced therefrom over which a filter web may be looped for filtering and for the discharge of accumulated solids, comprising, in combination, a filter web constructed in the form of an endless belt and composed of a plurality of flexible, endless filaments in parallel, contiguous relationship; each filament consisting of a series of non-pervious elements spring biased closely together between which effluent may pass and solids of filtration may not pass, guides on the filter drum to maintain the said relationship of the filaments, and positioning means to adjust the spacing between the drum and discharge roller and to thereby regulate the tensioning of the filaments.

2. Filtering apparatus for a drum filter of the type employing an axially rotatable drum and a discharge roller remotely spaced therefrom over which a filter web may be looped for filtering and for the discharge of accumulated solids, comprising, in combination, a filter web constructed in the form of an endless belt and composed of a plurality of flexible, endless filaments in parallel, contiguous relationship; each filament consisting of a series of helical spring coils biased closely together between which effluent may pass and solids of filtration may not pass, guides on the filter drum to maintain the said relationship of the filaments, and positioning means to adjust the spacing between the drum and discharge roller and to thereby regulate the tensioning of the filaments.

3. Filtering apparatus for a drum filter of the type employing an axially rotatable drum and a discharge roller remotely spaced therefrom over which a filter web may be looped for filtering and for the discharge of accumulated solids, comprising, in combination, a filter web constructed in the form of an endless belt and composed of a plurality of flexible, endless filaments in parallel, contiguous relationship; each filament consisting of a series of flat, circular discs spring biased closely together between which effluent may pass but solids of filtration may not pass, guides on the filter drum to maintain the said relationship of the filaments, and positioning means to adjust the spacing between the drum and discharge roller and to thereby regulate the tensioning of the filaments.

THOMAS R. KOMLINE.

References Cited in the file of this patent

UNITED STATES PATENTS

| Number | Name | Date |
|---|---|---|
| 484,276 | Wright | Oct. 11, 1892 |
| 1,264,193 | Leonard | Apr. 30, 1918 |
| 1,371,513 | Nickerson | Mar. 15, 1921 |
| 1,876,123 | Wright | Sept. 6, 1932 |
| 2,031,165 | Johnson | Feb. 18, 1936 |
| 2,095,303 | Wright | Oct. 12, 1937 |
| 2,198,912 | Fedeler | Apr. 30, 1940 |
| 2,217,833 | Chapman | Oct. 15, 1940 |
| 2,247,460 | Wright | July 1, 1941 |
| 2,426,886 | Komline | Sept. 2, 1947 |